United States Patent [19]
Gotovchikov et al.

[11] Patent Number: 5,882,581
[45] Date of Patent: Mar. 16, 1999

[54] APPARATUS FOR THE PROCESSING OF SOLID MIXED WASTE CONTAINING RADIOACTIVE AND HAZARDOUS MATERIALS

[75] Inventors: Vitaly T. Gotovchikov; Alexander V. Ivanov; Eugene A. Filippov, all of Moscow, Russian Federation

[73] Assignee: Institute of Chemical Technology (PlasTech), Moscow, Russian Federation

[21] Appl. No.: 911,071

[22] Filed: Aug. 14, 1997

Related U.S. Application Data

[62] Division of Ser. No. 557,961, Nov. 13, 1995, Pat. No. 5,750,822.

[51] Int. Cl.$^6$ ........................................... C21C 1/00
[52] U.S. Cl. ........................ 266/241; 266/242; 266/200; 58/11
[58] Field of Search ................................. 266/200, 242, 266/241; 588/11; 219/121.59

[56] References Cited

U.S. PATENT DOCUMENTS

| | | | |
|---|---|---|---|
| 4,018,973 | 4/1977 | Paton et al. | 219/121 |
| 5,136,137 | 8/1992 | Schlienger | 219/121.59 |
| 5,750,822 | 5/1998 | Gotovchikov et al. | 588/11 |

*Primary Examiner*—Scott Kastler
*Attorney, Agent, or Firm*—Bradley W. Smith; Mark P. Dvorscak; William R. Moser

[57] ABSTRACT

Apparatus for the continuous heating and melting of a solid mixed waste bearing radioactive and hazardous materials to form separate metallic, slag and gaseous phases for producing compact forms of the waste material to facilitate disposal includes a copper split water-cooled (cold) crucible as a reaction vessel for receiving the waste material. The waste material is heated by means of the combination oaf plasma torch directed into the open upper portion of the cold crucible and an electromagnetic flux produced by induction coils disposed about the crucible which is transparent to electromagnetic fields. A metallic phase of the waste material is formed in a lower portion of the crucible and is removed in the form of a compact ingot suitable for recycling and further processing. A glass-like, non-metallic slag phase containing radioactive elements is also formed in the crucible and flows out of the open upper portion of the crucible into a slag ingot mold for disposal. The decomposition products of the organic and toxic materials are incinerated and converted to environmentally safe gases in the melter.

10 Claims, 6 Drawing Sheets

APPARATUS FOR THE PROCESSING OF SOLID MIXED WASTE CONTAINING RADIOACTIVE AND HAZARDOUS MATERIALS

This application is a division of application Ser. No. 08/557,961. filed Nov. 13, 1995, which application is now U.S. Pat. No. 5,750,822.

CONTRACTUAL ORIGIN OF THE INVENTION

The United States Government has rights in this invention pursuant to a contract with the United States Department of Energy.

FIELD OF THE INVENTION

This invention relates generally to the processing of solid waste containing radioactive and/or hazardous materials and is particularly directed to apparatus and a method for reducing solid waste to compact form for recycling or storage while incinerating and converting the decomposition products of the organic and toxic materials to environmentally safe gases.

BACKGROUND OF THE INVENTION

The processing and disposal of radioactive and hazardous waste materials is one of the most pressing environmental remediation problems. In most cases, such waste materials have a wide range of compositions that include metals, ceramics, and organic materials. It is generally desirable that prior to disposal, such waste materials are reduced to a compact form. Compaction of the waste materials is typically achieved by melting the waste and cooling the molten mass to crystallized or vitreous (slag) materials.

One approach to the melting and reducing of waste materials is disclosed in U.S. Pat. Nos. 4,770,109 issued Sep. 13, 1988, and 5,136,137 issued Aug. 4, 1992. This approach employs a rotating drum adapted to receive a hot plasma from a plasma torch for melting the mixed waste and discharging the molten mass into an ingot mold. The thus produced and cooled waste products are poured into containers together with the ingot molds for final disposal. Emitted toxic gases given off by the thermal decomposition of organic and hazardous materials are partially incinerated in the reactor vessel, with the remainder further incinerated in a secondary burner and, after transiting an off-gas system, released into the environment. The rotating drum is comprised of a ceramic material which offers only limited heat resistance and corrosion resistance to metals or to the slag molten mass generated during reduction of the waste materials. As a result, the rotating drum must be periodically replaced, which procedure is complicated by the high level of radioactive contamination of the drum. Also in the rotating drum approach, the radioactive materials are spread out throughout the entire volume of the thus produced solid waste product, limiting the compaction of the radioactive waste and requiring the entire product to be handled and disposed of as radioactive waste, substantially increasing the complexity and cost of such disposal.

Currently, the most promising radioactive waste form for handling and disposal involves the incorporation of the radioactive waste into a glasslike matrix of a special composition which is not subject to destruction during long-term storage. It would therefore be highly desirable to be able to separate the radioactive waste material from the nonradioactive waste and to incorporate the radioactive waste into a glasslike matrix having a very durable and stable composition and structure for long-term storage. Prior art approaches do not provide for the separation of radioactive materials from the remaining hazardous waste materials, and do not account for the generation and discharge into the atmosphere of hazardous gases generated during the waste melting process. Thus, toxic gases given off during the high temperature decomposition of organic and toxic materials are discharged from the reactor vessel into the atmosphere.

The present invention addresses the aforementioned limitations of the prior art by providing apparatus and a method for the processing of solid mixed waste which allows for the discharge of a radioactive slag molten mass directly into a waste tank intended for final disposal, while a non-radioactive molten metal mass is crystallized into a compact ingot which could be recycled into radioactive waste storage containers. The present invention allows for the continuous processing of solid mixed waste material over an extended period of time without requiring the replacement of, maintenance to, or cleaning of the reaction vessel. The high temperatures achieved in the reaction vessel convert the toxic gases given off from the decomposition of organic and toxic materials to environmentally safe gases which can be discharged to the atmosphere.

OBJECTS AND SUMMARY OF THE INVENTION

Accordingly, it is an object of the present invention to reduce solid mixed waste containing radioactive and hazardous materials to separate metallic, slag and gaseous phases to facilitate handling, disposal and recycling of these materials.

It is another object of the present invention to convert solid mixed waste containing radioactive and hazardous materials to compact non-radioactive metallic ingots and glasslike, non-metallic ingots containing the radioactive materials to facilitate storage of the radioactive materials and recycling of the non-radioactive, metallic materials.

Yet another object of the present invention is to incinerate the decomposition products of the organic and toxic materials in solid mixed waste and convert the decomposition products to environmentally safe gases using the combination of hot plasma and induction heating.

A further object of the present invention is to provide apparatus and a method for the continuous processing of solid mixed waste containing radioactive and hazardous material employing a cold crucible arrangement capable of extended operation without intermediate maintenance or cleaning.

This invention contemplates apparatus and a method for the continuous processing of solid mixed waste containing radioactive and hazardous materials for reducing the waste volume to facilitate handling and disposal. The solid mixed waste and a glass forming flux are deposited in a copper split water-cooled (cold) crucible containing a metal melt. The waste and flux mixture is heated by the combination of a plasma torch directed into the cold crucible and electromagnetic induction produced by induction coils disposed about the cold crucible which is transparent to the electromagnetic fields. The waste and flux mixture is continuously melted by the induction field and plasma torch(es) combination and is maintained in a molten state for 0.5–60 minutes. As the waste and flux are continuously deposited in the cold crucible, excess molten slag containing the radioactive material is removed from an upper portion of the crucible, and is maintained in a molten state for 0.5–30 minutes.

Excess metallic, non-radioactive molten mass is removed from the bottom of the crucible in the form of a compact ingot for disposal or recycling.

A primary advantage of the present invention is that it combines two modes of heating the waste material: induction and plasma heating. In that the heating and melting of ceramic and metal fractions by induction currents of similar frequencies is not feasible due to the different conductivities of these fractions, the present invention employs induction currents in the frequency range of from 50 to 440,000 Hz for heating and melting the metal fraction of the mixed waste. The induction currents are used in combination with the application of plasma torch(es) for heating and melting the ceramic, as well as the organic, fractions. The application of induction currents of relatively low frequency provides the intense electromagnetic mixing of the smelt, producing optimal mass exchange conditions for the metal and slag phases. When an oxidizer such as oxygen, air or $KMnO_4$ is fed into the molten mass, radioactive elements being chemically active will be oxidized and converted into the slag phase. Because a slag molten mass is considered to be a very aggressive chemical medium (highly reactive), organic and toxic materials decompose in the slag molten mass very rapidly. With this decomposition, providing an oxidizer into the slag molten mass causes the decomposition products to be oxidized directly in the slag molten mass, producing environmentally safe gases such as $H_2O$ and $CO_2$.

More specifically, this invention contemplates an apparatus for continuous processing of a solid mixed waste of metals, ceramics and organics, including radioactive and hazardous materials, for disposal, the apparatus comprising: a water cooled copper crucible having an open upper portion for receiving the solid mixed waste; one or more plasma torches for directing plasma into the open upper portion of the water cooled crucible for heating and melting the ceramics and organics in the solid mixed waste; electric current carrying induction coils disposed adjacent the water cooled crucible for providing an electromagnetic field in the water cooled crucible for mixing the solid mixed waste and heating and melting the metals in the solid mixed waste, wherein melted metal forms in a lower portion of the water cooled crucible and melted ceramics and organics including radioactive and hazardous materials form in an upper portion of the water cooled crucible; a first extraction arrangement coupled to a lower portion of said water cooled crucible for removing the melted metal from the water cooled crucible and forming the melted metal into a first compact ingot; and a second extraction arrangement coupled to an upper portion of the water cooled crucible for removing the melted ceramics and organics from the water cooled crucible and forming the melted ceramics and organics into a second compact ingot.

BRIEF DESCRIPTION OF THE DRAWINGS

The appended claims set forth those novel features which characterize the invention. However, the invention itself, as well as further objects and advantages thereof, will best be understood by reference to the following detailed description of a preferred embodiment taken in conjunction with the accompanying drawings, where like reference characters identify like elements throughout the various figures, in which:

DETAILED DESCRIPTION OF THE PREFERRED EMBODIMENTS

Figure 1:
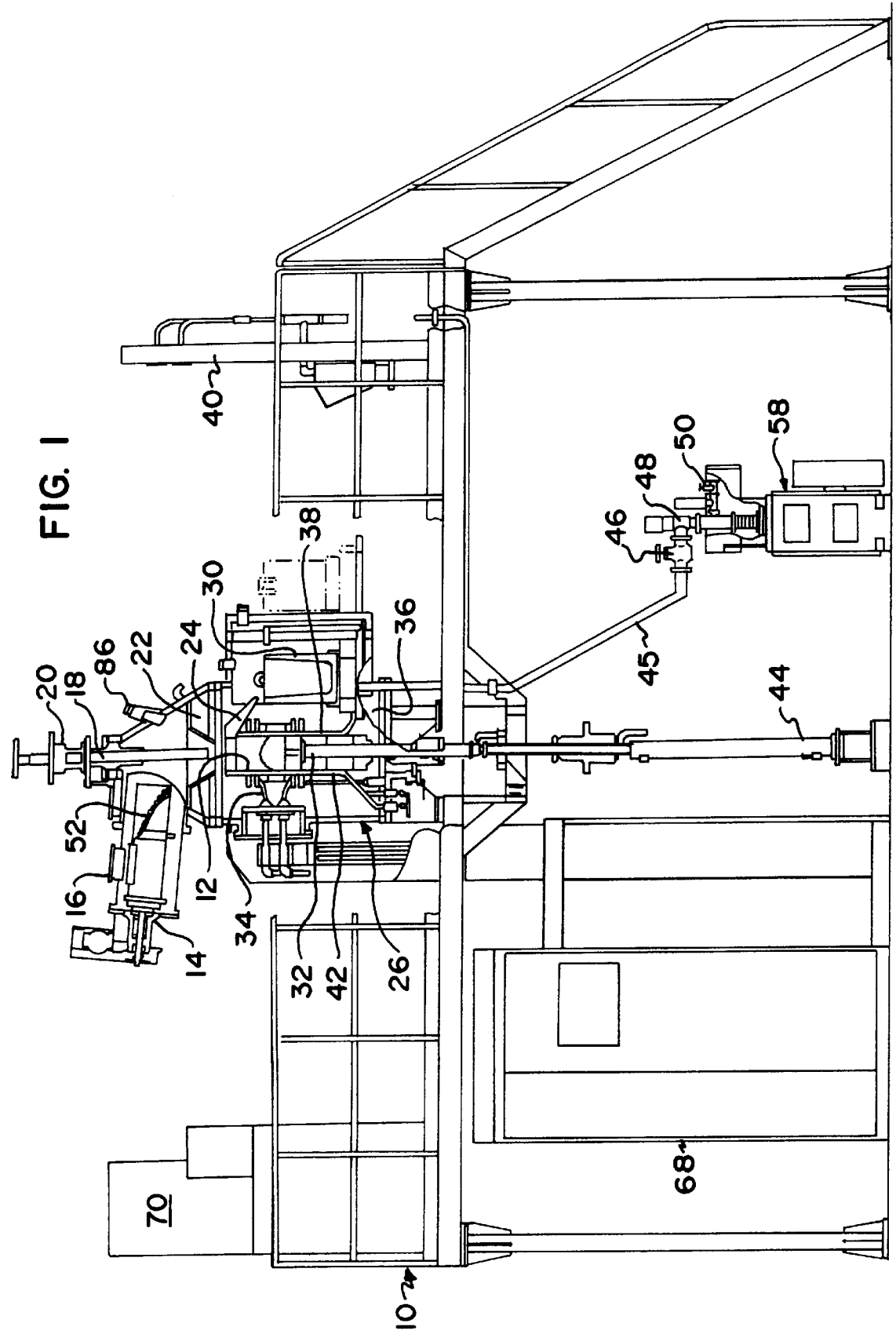
FIG. 1 is a partially cutaway lateral view of a plasma/induction vacuum melter with a cold crucible in accordance with the principles of the present invention.
Figure 1A:
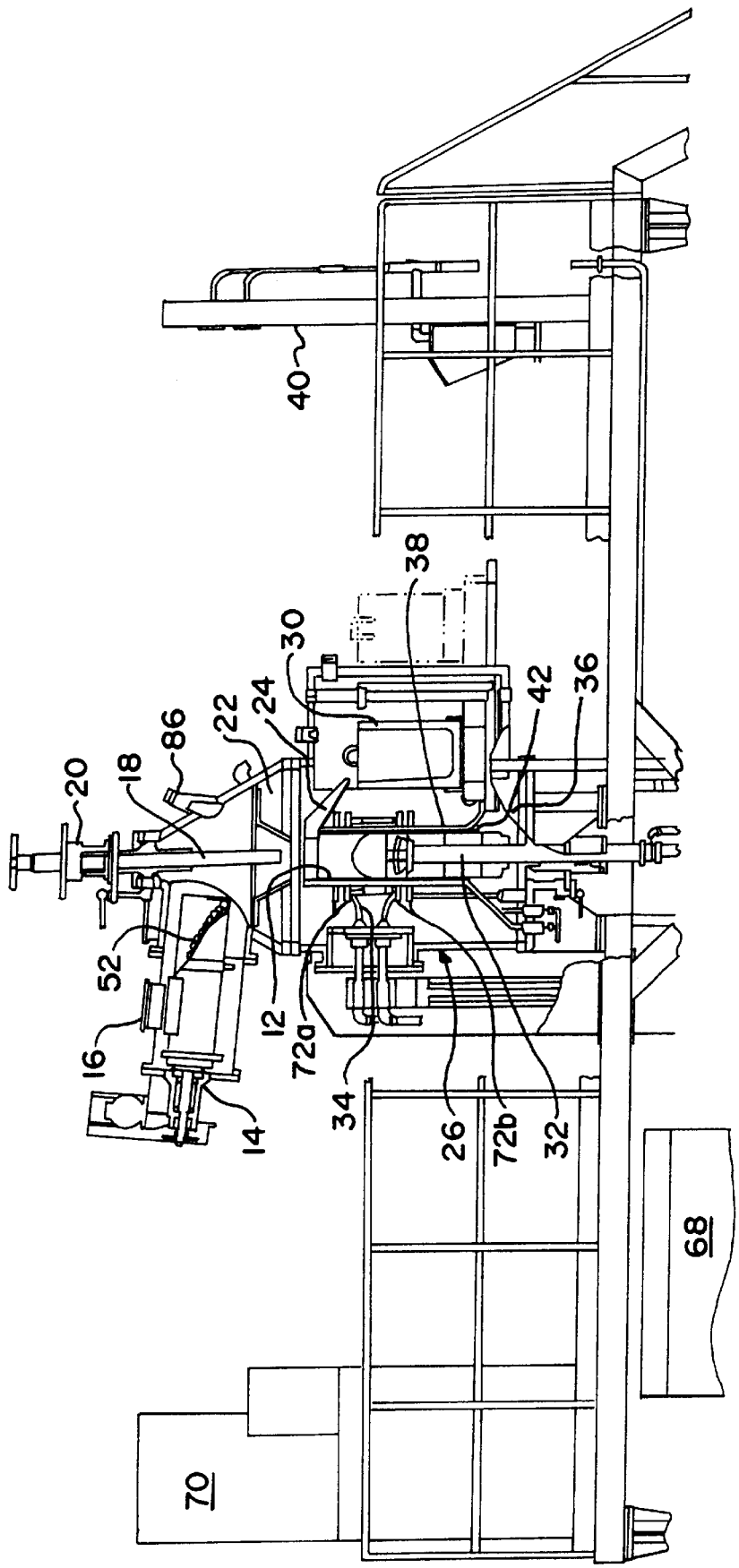
FIG. 1a is a partially cutaway side elevation view of the plasma/induction vacuum melter with a cold crucible of FIG. 1.

Referring to FIG. 1, there is shown a partially cutaway lateral view of a plasma/induction vacuum melter 10 with a cold crucible 12 in accordance with the present invention. Additional details of an upper portion of the plasma/induction vacuum melter 10 are shown in the enlarged partially cutaway side elevation view of the plasma/induction vacuum melter shown in FIG. 1a. Also with reference to FIG. 2, there is shown a horizontal sectional view of the sealed vacuum chamber 26 of the plasma/induction vacuum melter of the present invention.

The plasma/induction vacuum melter 10 includes the aforementioned cold crucible 12 disposed in the aforementioned sealed vacuum chamber 26. Cold crucible 12 is open at the top and is adapted to receive solid mixed waste material 52 deposited in a charging drive arrangement 14 disposed above the cold crucible. The charging drive arrangement 14 includes a waste material port 16 for deposit of the solid mixed waste 52 therein.

Disposed in an upper portion of the sealed vacuum chamber 26 is a plasma torch assembly 18. Sealed vacuum chamber 26 is adapted to receive one or more of the plasma torch assemblies 18, although only one such assembly is shown in the figures for simplicity. The plasma torch assembly 18 is attached to and supported by a support/positioning mechanism located above the sealed vacuum chamber 26. The plasma torch support/positioning mechanism 20 allows the plasma torch assembly 18 to be moved within the sealed vacuum chamber 26 for directing a high temperature plasma onto an inner portion of the cold crucible 12 as well as onto an overflow trough 24 attached to an upper portion of the crucible and onto a slag ingot mold, or container, 30 disposed adjacent the crucible. The plasma torch assembly (or assemblies) 18 is used primarily to heat and melt the glasslike, non-metallic slag phase of the solid mixed waste comprised primarily of ceramics and organics and containing radioactive elements. Each plasma torch assembly 18 is coupled to and energized by a plasma torch power supply 70. Also disposed in an upper portion of the sealed vacuum chamber 26 is a viewing port 86 for visually observing the solid mixed waste deposited in the cold crucible 12 and the manner in which the waste is processed as described below. Also disposed in an upper portion of the sealed vacuum chamber 26 is a lifting and indexing lid 22.

Figure 2:
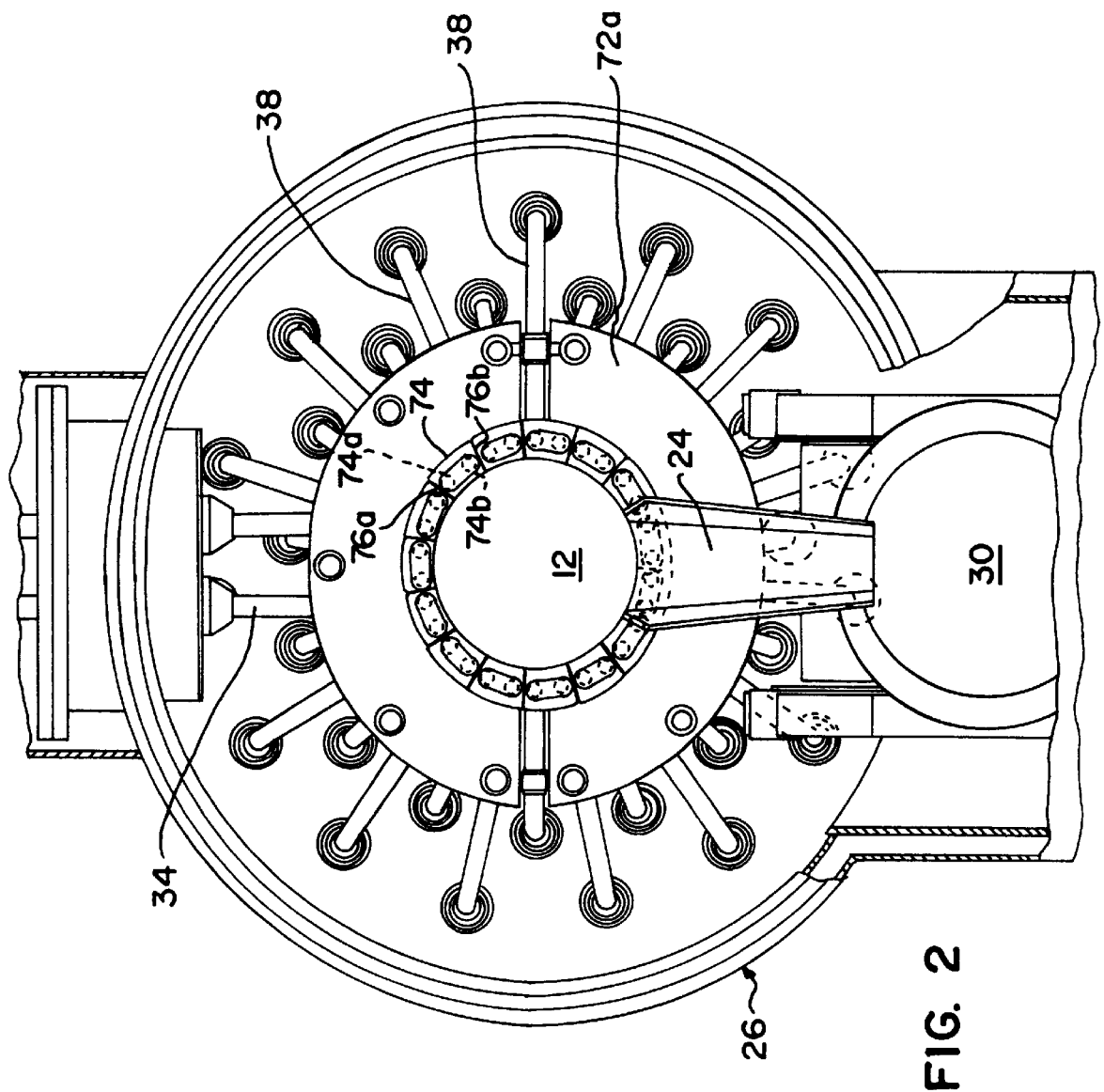
FIG. 2 is a horizontal sectional view of the sealed vacuum chamber of the plasma/induction vacuum melter of the present invention.

As shown in the sectional view of FIG. 2, the cold crucible 12 has a lateral wall portion comprised of a plurality of cold wall sections 74 disposed about the periphery thereof. The cold crucible 12 including its cold wall sections 74 is preferably comprised of copper. Disposed between adjacent cold wall sections is a dielectric insulator. Thus, as shown in FIG. 2, first and second dielectric insulators 76a and 76b are disposed between and separate cold water section 74 from similar cold water sections on each side thereof. With the lateral faces of adjacent cold wall sections 74 in close spacing while being electrically insulated from one another by the dielectric insulators, the copper cold crucible 12 is highly permeable to electromagnetic fields. Each cold water section includes one or more cooling water ducts, or channels, extending therethrough. Thus, cold wall section 74 includes first and second cooling water ducts 74a and 74b. Each of the aforementioned cooling ducts is coupled to one of a plurality of cooling water tubes 38 disposed within the sealed vacuum chamber 26 for cooling the lateral wall of the cold crucible 12. Each of the cooling water tubes 38 is coupled to a cold water reservoir (not shown for simplicity), as well as to a water control panel 40 for controlling the flow of water through the tubes and crucible cold wall sections in regulating the temperature of the crucible's lateral wall.

Concentrically disposed about the outer periphery of the cold crucible 12 and within the sealed vacuum chamber 26 are a plurality of multiloop induction heating coils 34. Induction heating coils 34 are coupled to an induction power supply 68 which directs large currents through the coils so as to form a large electromagnetic induction field within the cold crucible 12 for melting the solid mixed waste deposited therein, particularly the metal portion of the waste. In addition, the application of induction currents of relatively low frequency, i.e., preferably in the range of 50–440,000 Hz, provides intense electromagnetic mixing of the smelt, for optimal mass exchange conditions for the metal and slag phases.

The overflow trough 24 is formed in an upper portion of the cold crucible 12 such as by shortening several adjacent cold wall sections. The overflow trough 24 is adapted for receiving the excess, or overflow, of ceramics and organics heated primarily by the induction field within the cold crucible 12. Overflow trough 24 directs the excess melted ceramics and organics into a glass slag ingot mold 30 disposed adjacent the cold crucible 12. The ceramics and organics deposited in the glass slag ingot mold 30 contains radioactive elements encased in the glasslike slag which facilities disposal of the radioactive elements. Each of the plasma torch assemblies 18 is adapted for movement by the support/positioning mechanism 20 to permit the plasma torches to direct the hot plasma onto the slag overflow trough 24 and glass slag ingot mold 30 to prevent early crystallization of the slag molten mass before deposit in the mold vessel. Upper and lower insulator rings 72a and 72b are respectively disposed above and below the electromagnetic field induction coils 34 and concentrically about the cold crucible 12 for insulating the inductor coils. The upper and lower insulator rings 72a, 72b can be more clearly seen in the partially cutaway partial side elevation view of the plasma/induction vacuum melter 10 of the present invention shown in FIG. 3.

Figure 3:
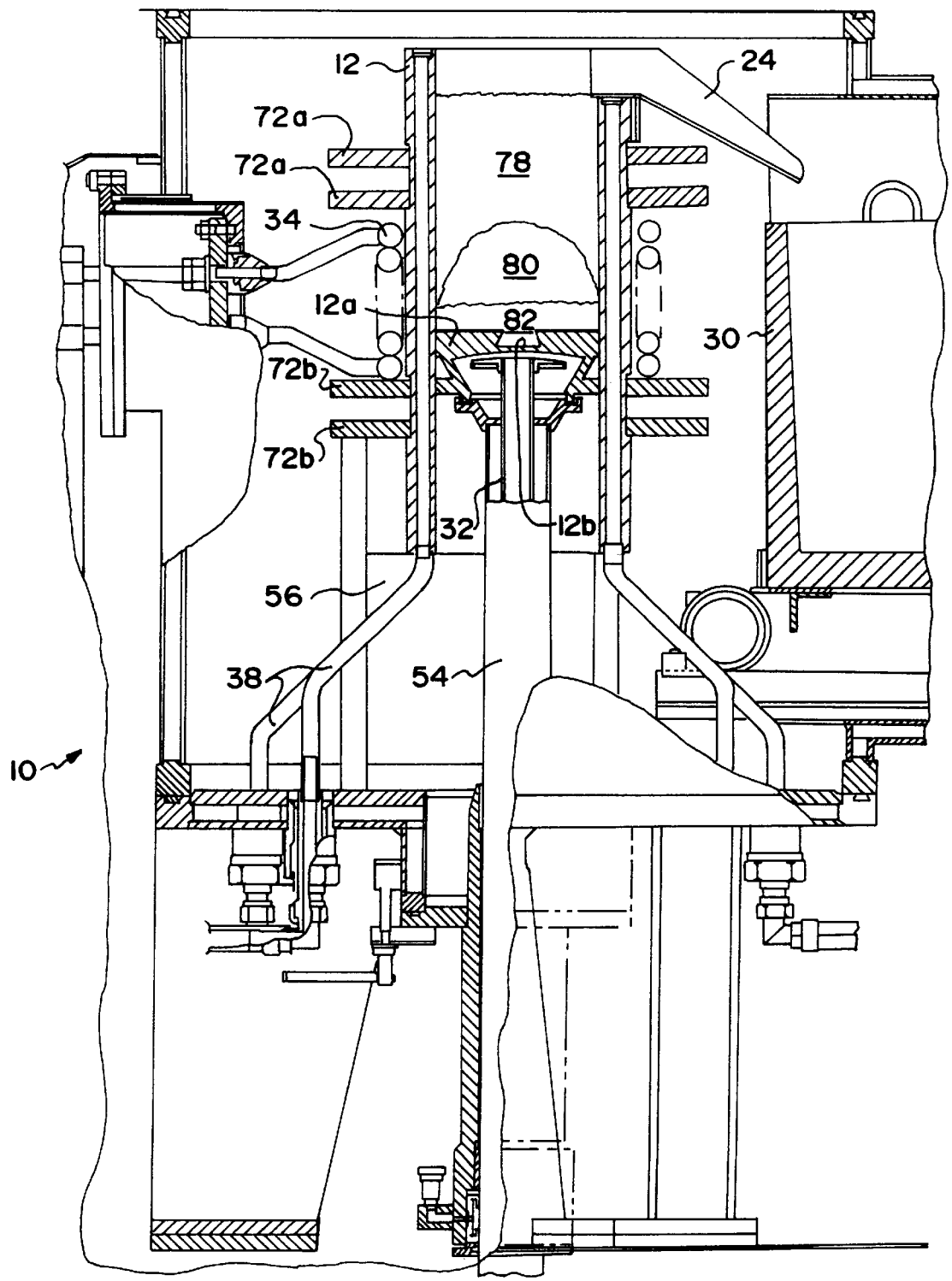
FIG. 3 is a partially cutaway vertical sectional view of the plasma/induction vacuum melter of the present invention illustrating details of the induction charging, water cooling and cold-wall crucible systems of the invention.

Extending downward from the cold crucible 12 is a water cooled support shaft 54. Disposed within the support shaft 54 is water cooled metal ingot support member 32. Ingot support member 32 is adapted for vertical movement and is coupled at its Upper end to the moveable bottom portion 12a of the cold crucible 12. The moveable bottom portion 12a of cold crucible 12 includes a trapezoidal groove 12b which is adapted to receive the molten metal 80 in the lower portion of the cold crucible in the form of a metal ingot 82. The trapezoidal groove 12b and the adjacent portion of the moveable crucible bottom 12a permit the contents of the crucible to be moved upward and downward within the cylindrical wall 12c forming the sidewall of the cold crucible 12. In particular, the trapezoidal groove 12b facilitates withdrawal of the metal ingot 82 from the cold crucible 12 and downward displacement of the metal ingot shown as element 42 in the withdrawn position in FIG. 1a. As shown in FIG. 3, located above the molten metal 80. is the ceramics and organics glass slag 78 containing the radioactive elements which are discharged from the cold crucible 12 via the slag overflow trough 24 into the glass slag ingot mold 30 as previously described.

In a preferred embodiment, the internal diameter $d_C$ of the cold crucible, the external diameter $D_C$ of the cold crucible, and the external diameter $D_P$ of the plasma torch, or each plasma torch, have the following relationship:

$$d_C = D_C + (2.1 \text{ to } 4.0)D_P$$

Figure 4:
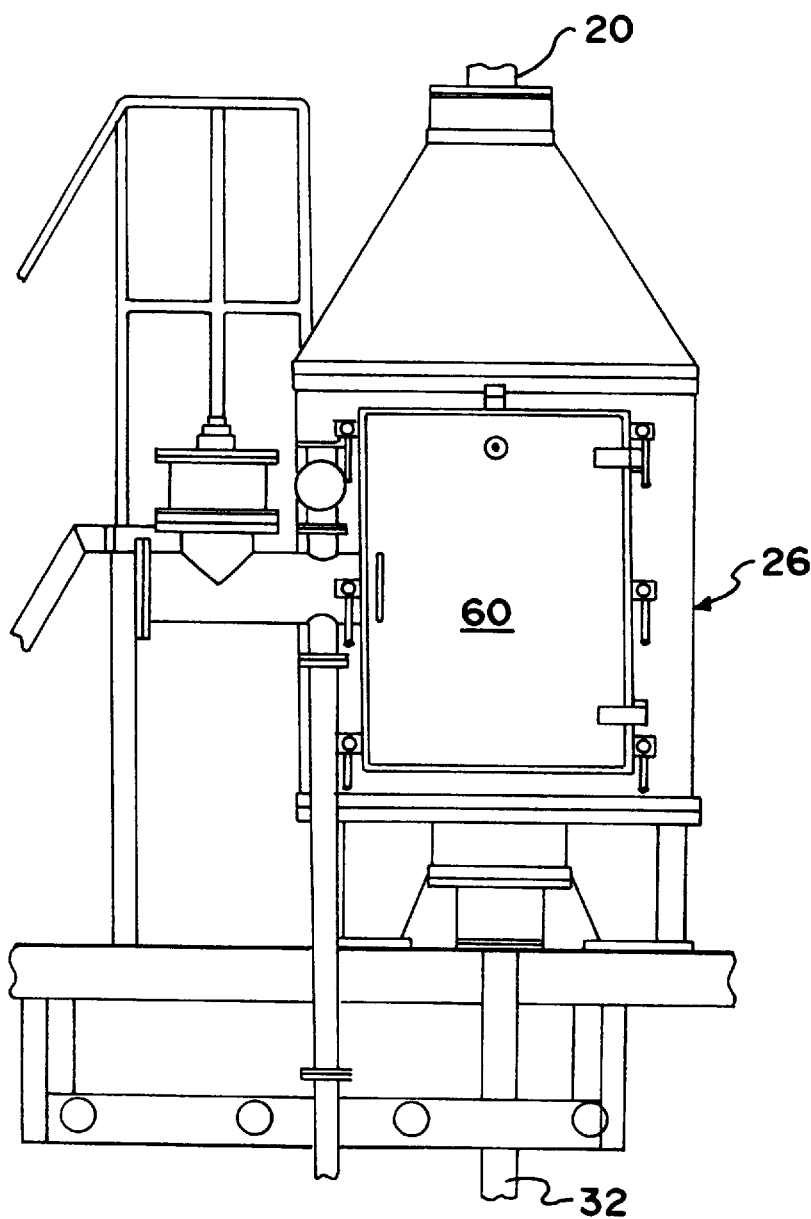
FIG. 4 is a side elevation view of the sealed vacuum chamber of the inventive plasma/induction vacuum melter.
Figure 5:
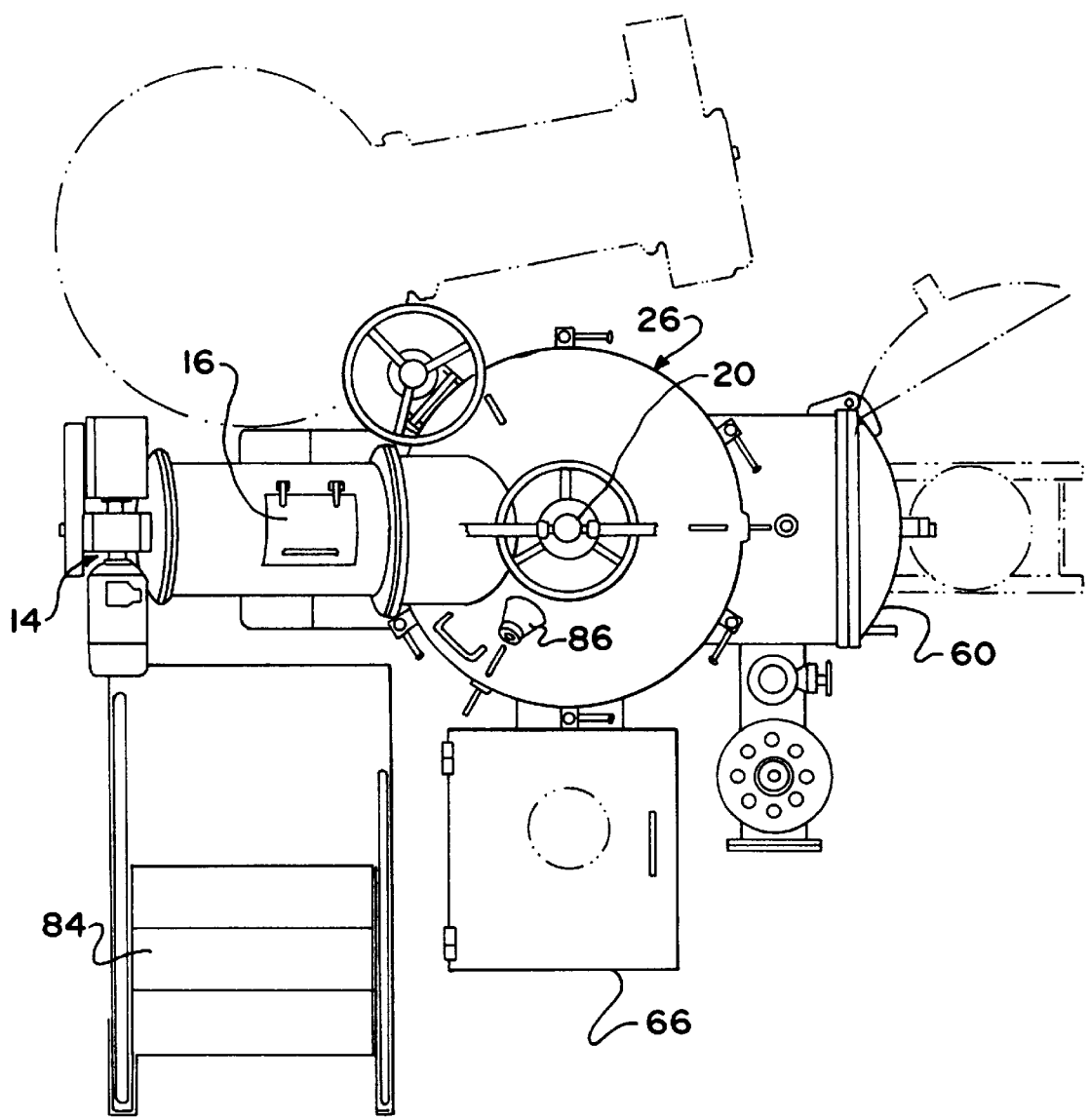
FIG. 5 is a top plan view of the sealed vacuum chamber of the inventive plasma/induction vacuum melter.

A vacuum pump 58 is coupled to the sealed vacuum chamber 26 by means of the combination of a vacuum duct 45, a hand operated vacuum valve 46, an electrically driven vacuum valve 48, and a hand operated air inlet valve 50. Vacuum pump 58 provides for the evacuation of the sealed vacuum chamber 26 during operation of the plasma/induction vacuum melter 10. A lower end portion of the metal ingot support member 32 is coupled to a drawing gear 44 for removing the metal ingot from the cold crucible 12. As shown in the side elevation view of FIG. 4, the sealed vacuum chamber 26 includes an access door 60 for removing the glass slag ingot mold from the sealed vacuum chamber. As shown in FIG. 5, disposed adjacent the charging drive arrangement 14 is a flight of feeder stairs 84 to allow a worker to deposit solid mixed waste into the waste material port 16. A metal slag compartment 66 is coupled and disposed adjacent to the sealed vacuum chamber 26.

There has thus been shown apparatus and a method for the continuous processing of solid mixed waste bearing radioactive and hazardous materials to form separate metallic, slag and gaseous phases for producing compact forms of the waste material to facilitate storage and disposal. The solid mixed waste is deposited into a cold crucible and is mixed and heated by means of the combination of one or more plasma torches and a series of electro-magnetic induction coils. The molten waste mass is in contact with the intensely cooled copper segments of the cold crucible including its water-cooled bottom portion. The cold crucible is disposed within a sealed vacuum chamber and is transparent to electromagnetic fields. There is no reaction between the molten waste mass and the cold crucible, allowing the cold crucible to be used continuously over an extended period of time without intermediate maintenance or cleaning. The combination of induction and plasma heating provides overheating, of the molten waste mass to separate the metallic and slag phases. Feeding an oxidizer into the molten mass provides mixing of the metallic phase, oxidation and conversion of all radioactive elements into the slag phase, as well as oxidation of thermal decomposition products of organic and toxic materials to generate environmentally safe gases. Feeding the fluxes into the melter stimulates vitrification of the radioactive waste directly in the melter, permitting the molten mass to be discharged into tanks for final disposition. The metallic phase is subject to crystallization, thereby forming a compact nonradioactive ingot which can be recycled to fabricate waste storage containers. Providing the sealed container with a vacuum or with a reducing atmosphere such as of inert gases allows the plasma/induction vacuum melter to be operated in a pyrolysis mode wherein the organics are pyrolyzed forming hydrocarbons which are directed to an off-gas system, with the carbon residues and oxides falling down in ash form into the melter.

While particular embodiments of the present invention have been shown and described, it will be obvious to those skilled in the art that changes and modifications may be made without departing from the invention in its broader aspects. Therefore, the aim in the appended claims is to cover all such changes and modifications as fall within the true spirit and scope of the invention. The matter set forth in the foregoing description and accompanying drawings is offered by way of illustration only and not as a limitation. The actual scope of the invention is intended to be defined in the following claims when viewed in their proper perspective based on the prior art.

The embodiments of the invention in which an exclusive property or privilege is claimed are defined as follows:

1. Apparatus for continuous processing of a solid mixed waste of metals, ceramics and organics, including radioactive and hazardous materials, for disposal, said apparatus comprising:

a water cooled copper crucible having an open upper portion for receiving the solid mixed waste;

one or more plasma torches for directing plasma into the open upper portion of said water cooled crucible for heating and melting the ceramics and organics in the solid mixed waste;

electric current carrying induction coils disposed adjacent said water cooled crucible for providing an electromagnetic field in said water cooled crucible for mixing the solid mixed waste and heating and melting the metals in said solid mixed waste, wherein melted metal forms in a lower portion of said water cooled crucible and melted ceramics and organics including radioactive and hazardous materials form in an upper portion of said water cooled crucible;

first extraction means coupled to a lower portion of said water cooled crucible for removing the melted metal from the water cooled crucible and forming the melted metal into a first compact ingot; and second extraction means coupled to an upper portion of said water cooled crucible for removing the melted ceramics and organics from the water cooled crucible and forming the melted ceramics and organics into a second compact ingot.

2. The apparatus of claim 1 wherein said second means includes the combination of an overflow trough attached to an upper portion of said water cooled crucible and an ingot mold disposed adjacent said overflow trough for receiving the melted ceramics and organics from said overflow trough.

3. The apparatus of claim 2 further comprising a moveable plasma torch support and positioning mechanism for moving the position of the plasma over an area including said water cooled crucible, said overflow trough, and said ingot mold.

4. The apparatus of claim 1 wherein said water cooled crucible has an internal diameter $d_C$ and an external diameter $D_C$, and wherein said one or more plasma torches each has an external diameter $D_P$, where $d_C = D_C + (2.1 - 4.0)D_P$.

5. The apparatus of claim 1 wherein said water cooled crucible includes a plurality of copper sections disposed about a lateral wall portion thereof, and wherein each of said copper sections includes one or more cooling water ducts.

6. The apparatus of claim 5 wherein said water cooled crucible further includes a plurality of dielectric insulators disposed about the periphery thereof and wherein each dielectric insulator is disposed intermediate a pair of adjacent copper sections.

7. The apparatus of claim 1 further comprising a sealed chamber disposed about and enclosing said water cooled crucible, said one or more plasma torches, and said induction coils.

8. The apparatus of claim 7 wherein said sealed chamber includes a viewing port for observing the melting of the metals, ceramics and organics in said water cooled crucible.

9. The apparatus of claim 7 wherein said sealed chamber is evacuated and contains an inert gas for pyrolyzing the organics to environmentally safe off-gases.

10. The apparatus of claim 7 wherein said sealed chamber contains an oxidizing gas for burning and converting the organics to an ash residue.

* * * * *